United States Patent [19]

Dallaire et al.

[11] Patent Number: 4,922,661
[45] Date of Patent: May 8, 1990

[54] WATER STOP FOR A WINDOW

[75] Inventors: Raymond Dallaire; Dominique Dallaire, both of St. David, Canada

[73] Assignee: Dallaire Industries Ltd., Lauzon, Canada

[21] Appl. No.: 319,823

[22] Filed: Mar. 3, 1989

Related U.S. Application Data

[63] Continuation of Ser. No. 82,501, Aug. 7, 1987, abandoned.

[30] Foreign Application Priority Data

Aug. 12, 1986 [GB] United Kingdom ............... 8619620

[51] Int. Cl.$^5$ .............................................. E06B 1/04
[52] U.S. Cl. ...................................... 49/504; 49/467; 49/476
[58] Field of Search ................. 49/404, 406, 408, 467, 49/470, 471, 476, 504

[56] References Cited

U.S. PATENT DOCUMENTS 2,219,594 10/1940 Lang ..................................... 49/504
3,384,998 5/1968 Abramson .............................. 16/90

FOREIGN PATENT DOCUMENTS 1194717 6/1965 Fed. Rep. of Germany ........ 49/476

Primary Examiner—Kenneth J. Dorner
Assistant Examiner—Gerald A. Anderson
Attorney, Agent, or Firm—Perry Carvellas

[57] ABSTRACT

A water stop for a window having improved resistance to the ingress of water due to rain or other precipitation regardless of the opening arrangement of the window. The stop consists of a low vertical wall member which extends parallel to and behind the outer sliding window pane or panes and which rises vertically from the sill to form a water barrier to stop any water migration across the sill.

9 Claims, 2 Drawing Sheets

WATER STOP FOR A WINDOW

This application is a continuation of application Ser. No. 07/082,501, filed 08/07/87, abandoned.

This invention relates to a window construction having improved resistance to ingress of water due to rain, etc.

Regardless of the opening arrangement of a window, it is possible for water to be driven under the opening pane or panes and thus enter the building upon which the window is installed. This can be a problem even in a double-glazed sliding window, wherein the inside and outside panes both slide between open and closed positions and define an air gap therebetween.

Although the double-glazed construction serves to inhibit ingress of water under normal weather conditions, under severe conditions—such as driving rain—it is fpossible for water to be driven under the outer panes and to migrate across the air gap and seep under the inner panes. Drain holes are commonly provided beneath the outer panes to allow water to drain away but under very severe wind conditions, for example, the air pressure driving the water against the window can be sufficient to prevent proper drainage.

With the foregoing in mind, some countries have adopted stringent building codes with respect to water penetration and, in some cases, require a window to withstand ingress of water driven by winds of 120 m.p.h. or more. Many sliding windows have difficulty meeting these standards and the problem is especially acute with single-glazed sliding windows and with double-glazed sliding windows where the panes slide horizontally. The difficulty is that glazing must be freely movable in the bottom sill tracks, otherwise smooth sliding is impaired. Thus, it is clearly a problem to provide cooperation between the outer panes and the tracks such as to prevent passage of water therebetween, and it is, therefore, desirable to provide a means of preventing water from reaching the inner sliding panes or, in the absence of inner panes, from progressing across the sill. As stated above, drain holes provided beneath the outer panes are normally effective to remove water, but become ineffective at the higher wind pressures to which the windows are subjected during compliance testing in some countries. The pressure differential created between the outside of the window and the air gap can effectively drive the water across the drain holes and into the air gap before it is able to drain. Other attempts to meet these tests have involved sill tracks of greater depth and/or complex seal configurations—all of which are either ineffective or they unacceptably increase the cost and complexity of the window.

The present invention provides a simple and extremely effective means of overcoming this problem. Although it is especially effective for horizontally sliding windows of the type more specifically described below, it is applicable to any type of sliding window construction.

According to the invention, there is provided a water stop in the form of a vertical wall which extends parallel to and behind the outer sliding window pane or panes and which rises vertically from the sill to form a water barrier. The height of the barrier is selected by experimentation, based upon the specific window design, the standards with which the window must comply and the weather conditions to which it is likely to be subjected. In practice, a height of between 6 mm and 25 mm will usually provide an appropriate balance between utility and aesthetic considerations.

Especially in the case of a horizontally sliding window, it is also preferable that the barrier wall be removable in order to allow the outer panes to be removed in the customary manner of pushing them upwardly against the window header (thus freeing them from their sill tracks) and then swinging them inwardly for removal from the inside of the window. For this purpose, the barrier is accommodated in a channel in the sill and may be a snap-fit therein and/or sealed therein by means of a suitable sealant, such as silicone.

The invention will now be described further by way of example only and with reference to the accompanying drawings, wherein.

Figure 1:
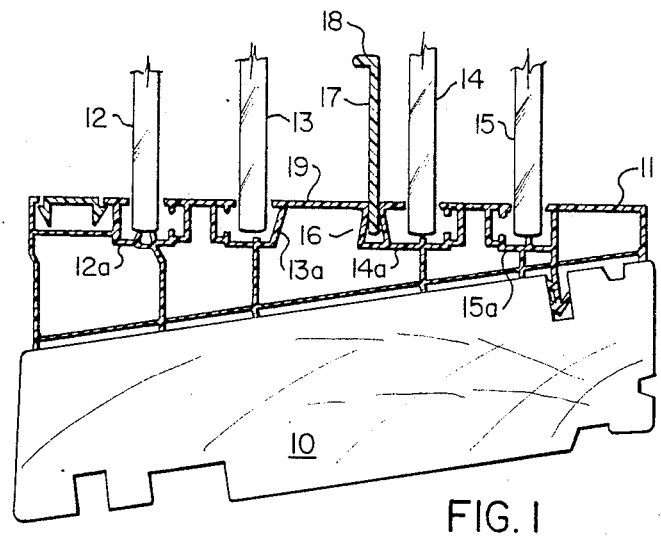
FIGS. 1 and 2 are cut-away sectional views (FIG. 1 in end view and FIG. 2 in perspective view) of the lower portion of a horizontally sliding, double-glazed window incorporating the present invention.
Figure 2:
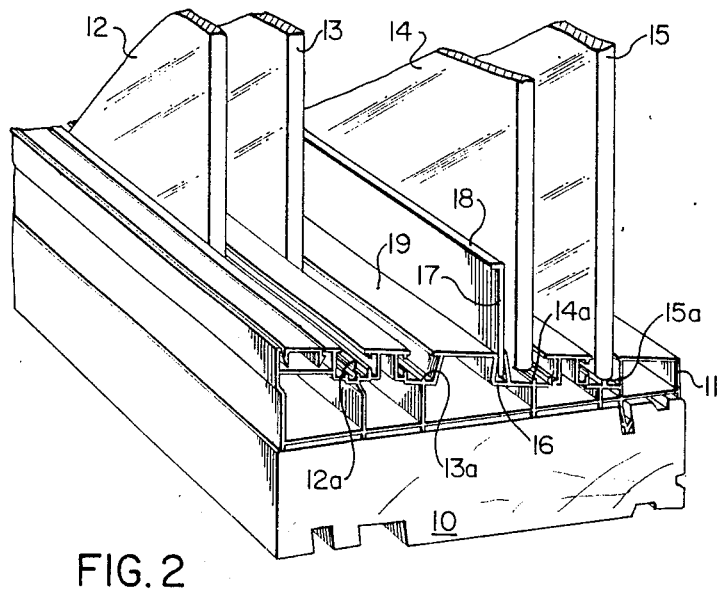

Referring to FIGS. 1 and 2, a window sill 10 has a sill track member 11 which is conveniently in the form of an extrusion of plastic, aluminum or other suitable material. The sill track 11 is formed with tracks 12a, 13a, 14a and 15a which accommodate sliding glass panes 12 through 15, respectively. Panes 12 and 13 face the outside and panes 14 and 15 face the inside of the building upon which the window is installed. Also formed in the sill track 11 is a channel 16 extending parallel to and intermediate the tracks 13a and 14a. The channel 16 accommodates a barrier consisting of a low vertical wall member 17, typically 6 mm to 25 mm in height, and optionally having a narrow flange 18 formed along its upper edge for a purpose hereinafter to be described.

In FIG. 2, the window is shown open but, obviously, it would be closed in the event of a severe storm. Even when closed, however, water can pass between the outer panes 12 and 13 and their respective tracks if the pressure differential between the outside and inside of the window is sufficiently great. Unchecked, this water could migrate across the sill track section 19 and, in the absence of the barrier 17, drive around and underneath the inner panes 14 and 15 with consequent ingress to the building. This migration is effectively checked by the barrier 17.

The barrier 17 may be formed integral with the sill track assembly 11 or, as illustrated by the drawings, be formed as a separate member which is inserted into channel 16 so as to be removable when required. The circumstances under which the barrier 17 would most likely require to be removed are when the outer panes 12 and 13 are to be removed. In a horizontally sliding window, these panes would normally be removed (after firstly removing the inner panes 14 and 15) by lifting them to clear the tracks 12a and 13a and then swinging them inwardly and downwardly to remove the panes from the header tracks (not shown) in which the upper edges of the panes travel. The flange 18 along the upper edge of the barrier wall, if supplied, is provided to assist in gripping the barrier 17 for its removal from or insertion in the channel 16.

Figure 3:
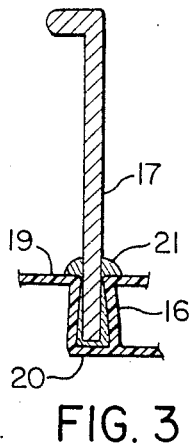
FIG. 3 is a detail of FIG. 2.

Referring to FIG. 3, it may be seen that the channel 16 is formed with walls which are inwardly inclined towards the top of the channel. Typically, the spacing between the walls at the bottom of the channel is 2.5 mm and the spacing at the top is 1.7 mm. The barrier 17 is preferably of constant and slightly greater thickness than the upper channel wall spacing (with the measurements given above, the barrier is preferably 2 mm) and therefore is a snug but removable interference fit in the channel 16. Optionally, the bottom of the channel may first be filled with sealant material 20, such as silicone, which occupies the space between the channel walls and the lower part of the barrier when the latter is inserted in the channel, but which does not prevent removal of the barrier 17 when required. Alternatively or additionally, the sealant may be provided as a bead along each side of the barrier 17 at its interface with the surface 19 of the sill track, as shown at 21 in FIG. 3.

Figure 4:
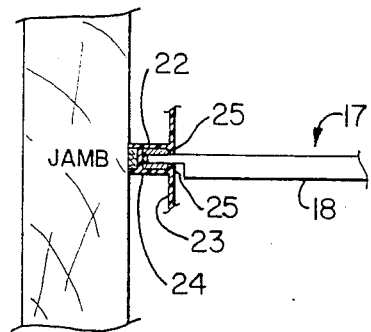
FIG. 4 is a top view of one end of the barrier according to the invention, showing its cooperation with a jamb track.

Referring now to FIG. 4, each end of the barrier 17 snaps into a vertical channel 22 formed in a jamb tract 23 (only a portion of which is shown in section in FIG. 4, for simplicity). The jamb track normally rests upon the sill track and is sealed thereto with silicone or the like around its bottom edge to prevent passage of water. It is, therefore, convenient to extend this sealant 24 upwardly into the channel 22 containing the end of the barrier 17 but, as in the case of the interface between the barrier 17 and the channel 16 of the sill track 11, such sealing is not essential, providing the barrier fits snugly into the channel. The particular construction shown in FIG. 4 comprises opposed lips 24 extending from each side of the channel 22 and gripping the barrier 17.

To remove the barrier from the window (having removed the inner panes 14 and 15) it is simply necessary to pull the barrier upwardly until it clears the channel 16 and then flex it to remove each end from the respective cooperating channel 22. Installation is performed in reverse sequence.

Figure 5:
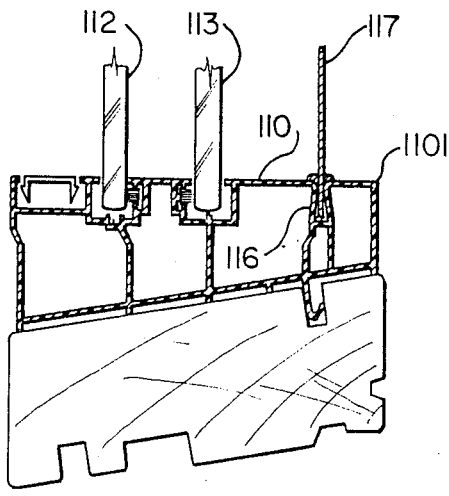
FIG. 5 is a sectional end view of the lower portion of a horizontally sliding single-glazed window incorporating the present invention.

As stated above, the present invention is by no means confined to double-glazed windows. FIG. 5 shows in cross-section a typical single-glazed window having horizontally sliding panes 112 and 113. The barrier 117 is located in channel 116 and serves to prevent water forced beneath the sliding panes 112 and 113 from migrating to and spilling over the inside edge 1101 of the window sill 110.

It will be appreciated that the type of glazing employed is not critical to the efficacy of the water stop according to this invention. For example, one or both sets of sliding panes 12,13 and 14,15 of FIG. 1 may be substituted by double-glazed or triple-glazed sealed units or, considering the case of FIG. 5, the single pairs of sliding panes 112 and 113 may be replaced by such units. In all such cases, the water-stop functions in precisely the same manner to inhibit water driven under the outer panes or sealed units from migrating across the sill and either to the edge of the sill (in a single-glazed window) or to the inner pair of panes or sealed units in a double-glazed window.

Figure 6:
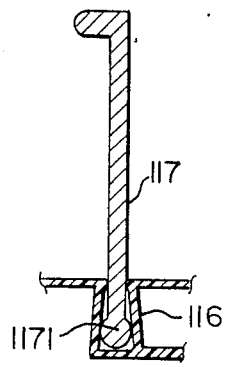
FIG. 6 shows one of the alternative barrier constructions to that of FIG. 3.

FIG. 6 illustrates a further embodiment of the water stop which, whilst similar to the embodiment of FIG. 3, provides for a snap-fit in the channel 116. The barrier 117 is formed along its bottom edge with an enlarged formation 1171 of generally rounded cross-section. The formation 1171 is dimensioned to enable a snap-fit in the channel 116 and its enlarged bottom profile serves to block passage of water between the inner walls and base of the channel 116 and the wall member 117 to such degree that the use of sealant in the channel was found to be unnecessary under all conditions tested to date. This is especially advantageous in allowing for the ready removal and replacement of the water stop without need to remove sealant from the channel.

What is claimed is:

1. In an exterior wall window construction comprising a sill, opposed jambs and at least one outer movable pane, the improvement comprising a water-stop in the form of a removable barrier received within a first track formed in said sill and said jams, said window construction including a second track formed in said sill, a movable pane is disposed in and is freely slidable in said second track, said first track located inwardly of said second track and spaced apart from all movable panes, relative to the orientation of said window construction in a wall opening, and said first track extending in said sill between said jambs and upwardly in said jambs from said sill parallel to said at least one outer movable pane; said removable barrier, when received within said first track, projecting above said sill parallel to and spaced apart from said movable pane; said removable barrier, when received within said first track, inhibiting passage of water thereover and co-operating with said sill and said jambs to inhibit the passage of water through the respective junctions between said removable barrier and said sill and between said removable barrier and said jambs.

2. The window construction of claim 1, wherein said window construction is a single-glazed construction and said removable barrier is located between said at least one outer movable pane and an inner edge of said sill.

3. The window construction of claim 1, wherein said window construction is a double-glazed construction which further comprises at least one inner movable pane and a third track formed in said sill, said at least one inner movable pane is disposed in and is freely slidable in said third track; said third track and said at least one inner movable pane is located inwardly of said first track, relative to the orientation of said window construction in a wall opening, and said third track is parallel to and spaced apart from said first track; said removable barrier, when received within said first track, projecting above said sill parallel to said at least one inner movable pane.

4. The window construction of claim 1, 2 or 3 wherein said removable barrier has sealant applied to an interface between said removable barrier and said first track and between said removable barrier and said jamb-track to inhibit passage of water there past.

5. The window construction of claim 1, 2 or 3, wherein said removable barrier is provided with an enlarged cross-sectional profile along or adjacent its lower edge to provide a snap-fit in said first track and having sealant applied to an interface between said removable barrier and said jamb-track.

6. The window construction of claim 1, 2 or 3, wherein said first track has opposed wall surfaces which converge towards an opening of said first track and said removable barrier is an interference fit in said first track.

7. The window construction of claim 1, 2 or 3, wherein said removable barrier is flanged along or adjacent its upper edge to facilitate gripping of said removable barrier for removal from and insertion into said first track.

8. The window construction of claim 1, 2 or 3, wherein said at least one outer movable pane is removable from said window construction by being lifted from said second track and pivoted inwardly relative to the orientation of said window construction in a wall opening; and wherein said removable barrier, when received within said first track, projects upwardly from said sill, parallel to said at least one outer movable pane, to such an extent as to interfere with removal of said at least one outer movable pane from said window construction, whereby said removable barrier must be removed from said window construction before said at least one outer movable pane may be removed from said window construction.

9. In an exterior wall window construction comprising a sill, opposed jambs and at least one outer movable pane, the improvement comprising a water-stop in the form of a removable barrier received within a first track formed in said sill and said jambs, said window construction including a second track formed in said sill, a movable pane is disposed in and is freely slidable in said second track, said first track located inwardly of said second track and spaced apart from all outer movable panes, relative to the orientation of said window construction in a wall opening, and said first track extending between said jambs and upwardly from said sill parallel to said at least one outer movable pane; said removable barrier, when received within said first track, projecting above said sill parallel to and spaced apart from said movable pane; said removable barrier, when received within said first track, inhibiting passage of water thereover and co-operating with said sill and said jambs to inhibit the passage of water through the respective junctions between said removable barrier and said sill and between said removable barrier and said jambs, and said at least one outer movable pane is removable from said window construction by being lifted from said second track and pivoted inwardly relative to the orientation of said window construction in a wall opening; and wherein said removable barrier, when received within said first track, projects upwardly from said sill, parallel to said at least one outer movable pane, to such an extent as to interfere with removal of said at least one outer movable pane from said window construction, whereby said removable barrier must be removed from said window construction before said at least one outer movable pane may be removed from said window construction.

* * * * *